J. AITCHISON.
MANUFACTURE OF BIFOCAL LENSES.
APPLICATION FILED JAN. 17, 1908.

993,812.

Patented May 30, 1911.

WITNESSES

INVENTOR

UNITED STATES PATENT OFFICE.

JAMES AITCHISON, OF LONDON, ENGLAND.

MANUFACTURE OF BIFOCAL LENSES.

993,812.            Specification of Letters Patent.      Patented May 30, 1911.

Application filed January 17, 1908. Serial No. 411,373.

*To all whom it may concern:*

Be it known that I, JAMES AITCHISON, a subject of the King of Great Britain, residing at 14 Newgate street, in the city of London, England, have invented certain new and useful Improvements in the Manufacture of Bifocal Lenses, of which the following is a specification.

This invention relates to that description of bifocal lens for spectacles and the like in which the minor lens is made from glass of higher refractive index and is contained within the glass of the major lens so that no edges or joints of the lens are present on either face of the bifocal lens, the major lens being made of two pieces of glass which completely inclose the glass minor lens. In the manufacture of such lenses there is considerable difficulty experienced and much time is occupied in grinding and fitting the glass minor lens, the cost of such bifocal lenses being nearly prohibitive.

My invention has for its object improvements in such lenses and in the manufacture thereof whereby the cost of production is largely decreased while retaining the necessary accuracy and efficiency.

According to my invention, I fill the recess, which is formed to the desired curvature of the minor lens in one glass of the major lens, with a suitable colorless cement such as balsam having a higher refractive index than the glass of the major lens; the other glass of the major lens is placed over the recessed face of that glass of the major lens so as to completely inclose the balsam, and the whole is allowed to set. The glass of the major lens may be given the desired curvature before or subsequent to the cementing together.

Figure 1:
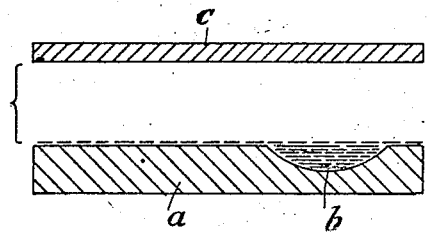
Figure 2:
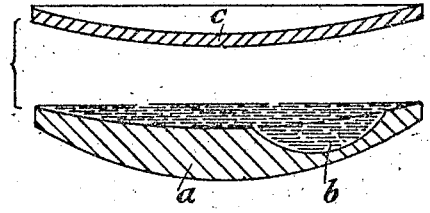

In the accompanying drawings, Figure 1 illustrates diagrammatically my invention with regard to plane (parallel) glasses and Fig. 2 to periscopic glasses.

The glasses of which the major lens is composed are commonly of two different thicknesses, the thicker glass *a* being formed with the recess *b* for the minor lens. The surface of the glass *a* is according to my invention, flooded with a high quality colorless cement such as Canada balsam in a melted state, filling the recess *b*, as indicated by the dotted lines; the cover glass *c* is then placed in position upon the recessed glass *a* in the ordinary manner, and the bifocal lens so produced is subjected to a baking heat for a time and then allowed to set, the minor lens being then composed of solid balsam which has acquired greater hardness through the more or less protracted baking. The glass I employ for the major lens is of a somewhat lower refractive index than that usually employed. It will be understood that any excess of fluid cement is expressed when the two glasses *a* and *c* are brought into contact.

By this means the grinding and accurate fitting of the minor lens is completely avoided thereby rendering the production of the complete bifocal lens less costly.

I claim:—

1. A method of manufacturing bifocal lenses of the description in which the shaped glasses of a major lens inclose a minor lens between them, consisting in providing one glass of the major lens with a recess shaped to conform to the shape of the desired minor lens, filling said recess with a colorless cement in a liquid state, placing the other glass of the major lens upon the raised surface of the first named glass, and allowing the cement to harden.

2. A method of manufacturing bifocal lenses of the description in which the shaped glasses of a major lens inclose a minor lens between them, consisting in providing one glass of the major lens with a recess shaped to conform to the shape of the desired minor lens, filling said recess with a colorless cement in a liquid state, placing the other glass of the major lens upon the raised surface of the first named glass, subjecting the combined glass to the action of heat, and allowing the cement to harden.

3. Method of manufacturing bifocal lenses of the description in which the shaped glasses of a major lens inclose a minor lens between them, consisting in providing one glass of the major lens with a recess shaped to conform to the shape of the desired minor lens, flooding the recessed surface of the said glass of the major lens with a colorless Canada balsam in a melted state, applying the other glass of the major lens to said flooded surface; subjecting the combined glasses to a baking heat, and finally allowing the whole to set, as set forth.

4. Method of manufacturing bifocal lenses of the description in which the shaped glasses of a major lens inclose a minor lens between them consisting in providing one glass of the major lens with a recess shaped to conform to the shape of the desired minor lens, flooding the recessed surface of the said glass with a colorless Canada balsam in a melted state, applying the other glass to said flooded surface; subjecting the combined glasses to light pressure to express surplus fluid cement, subjecting the combined glasses to a baking heat, and finally allowing the whole to set, as set forth.

5. Method of manufacturing bifocal lenses consisting in forming the major lens of two pieces of suitable glass shaped to the desired curvature, forming a recess conforming to the curvature of the desired minor lens in one of said glasses, flooding the recessed surface of said glass with a colorless Canada balsam in a melted state, applying the other glass to said flooded surface; subjecting the combined glasses to a baking heat, and finally allowing the whole to set, as set forth.

6. Method of manufacturing bifocal lenses, consisting in forming the major lens of two pieces of suitable glass, forming a recess conforming to the curvature of the desired minor lens in one of said glasses, flooding the recessed surface of said glass with a colorless Canada balsam in a melted state, applying the other glass to said flooded surface; subjecting the combined glasses to a baking heat, and shaping the combined glasses to the desired external curvature or curvatures after the whole has thoroughly set, as set forth.

In witness whereof I have hereunto set my hand in presence of two witnesses.

JAMES AITCHISON.

Witnesses:
GEORGE C. DOWNING,
G. F. WARREN.

Copies of this patent may be obtained for five cents each, by addressing the "Commissioner of Patents, Washington, D. C."